United States Patent
Kim et al.

(10) Patent No.: US 11,368,865 B2
(45) Date of Patent: Jun. 21, 2022

(54) METHOD AND APPARATUS FOR PERFORMING MEASUREMENT

(71) Applicant: LG ELECTRONICS INC., Seoul (KR)

(72) Inventors: Sangwon Kim, Seoul (KR); Sukhyon Yoon, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 16/771,388

(22) PCT Filed: Jan. 17, 2019

(86) PCT No.: PCT/KR2019/000696
§ 371 (c)(1),
(2) Date: Jun. 10, 2020

(87) PCT Pub. No.: WO2019/143146
PCT Pub. Date: Jul. 25, 2019

(65) Prior Publication Data
US 2020/0396628 A1    Dec. 17, 2020

Related U.S. Application Data

(60) Provisional application No. 62/618,615, filed on Jan. 17, 2018.

(51) Int. Cl.
*H04L 5/00* (2006.01)
*H04L 5/14* (2006.01)
*H04W 24/08* (2009.01)

(52) U.S. Cl.
CPC .......... *H04W 24/08* (2013.01); *H04L 5/0053* (2013.01)

(58) Field of Classification Search
CPC ...... H04W 24/08; H04L 5/0053; H04L 5/003; H04L 5/0048; H04L 5/0094
See application file for complete search history.

(56) References Cited

U.S. PATENT DOCUMENTS

| | | | |
|---|---|---|---|
| 2012/0020230 A1* | 1/2012 | Chen | H04L 1/0028 370/252 |
| 2019/0053235 A1* | 2/2019 | Novlan | H04L 43/0876 |
| 2020/0266958 A1* | 8/2020 | Liu | H04L 5/0092 |

(Continued)

OTHER PUBLICATIONS

Huawei et al., "Remaining details on CSI-RS design in NR," R1-1719438, 3GPP TSG RAN WG1 Meeting #91, Reno, USA, Nov. 17, 2017, See sections 6, 8.

(Continued)

*Primary Examiner* — Diane L Lo
*Assistant Examiner* — Abusayeed M Haque
(74) *Attorney, Agent, or Firm* — Dentons US LLP

(57) ABSTRACT

Provided are a method for performing a measurement by a user equipment (UE) in a wireless communication system, and an apparatus supporting the same. The method may include: configuring multiple bandwidth parts for a cell; configuring multiple reference signals for the cell; activating a first bandwidth part among the multiple bandwidth parts; when the activated first bandwidth part includes a first reference signal, activating the first reference signal included in the activated first bandwidth part; and performing the measurement for the cell based on the only activated first reference signal.

13 Claims, 18 Drawing Sheets

(56) References Cited

U.S. PATENT DOCUMENTS

2020/0336227 A1* 10/2020 Takeda .................... H04L 5/005
2020/0403763 A1* 12/2020 Takeda .............. H04W 72/1284
2021/0227568 A1*  7/2021 Harada ................. H04L 5/0048

OTHER PUBLICATIONS

Ericsson, "Partial band CSI reporting," R1-1716360, 3GPP TSG-RAN WG1 NR Ad Hoc #3, Nagoya, Japan, Sep. 12, 2017, See sections 2-3.

Qualcomm Incorporated, "Cell Definition for NR," R2-1800210, 3GPP TSG-RAN2 NR AH#0118, Vancouver, Cananda, Jan. 12, 2018, See section 2.

Interdigital, Inc., "Remaining details of BWP," R1-1718365, 3GPP TSG RAN WG1 #90bis, Prague, CZ, Oct. 2, 2017, Sections 1-2.2.

* cited by examiner

US 11,368,865 B2

METHOD AND APPARATUS FOR PERFORMING MEASUREMENT

This application is the National Stage filing under 35 U.S.C. 371 of International Application No. PCT/KR2019/000696, filed on Jan. 17, 2019, which claims the benefit of U.S. Provisional Application No. 62/618,615 filed on Jan. 17, 2018, the contents of which are all hereby incorporated by reference herein in their entirety.

BACKGROUND OF THE DISCLOSURE

Field of the Disclosure

The present invention relates to a wireless communication system, and more particularly, to a method for performing a measurement by a user equipment (UE) in a wireless communication system and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

Wide bandwidth (BW) has direct impact on the peak and user experienced data rates. However, since UEs are not always demanding high data rates, the use of wide BW may imply higher idling power consumption both from RF and baseband signal processing perspectives. In this regard, a newly developed concept of BWP for NR provides a means of operating UEs with smaller BW than the configured channel bandwidth (CBW), which makes NR an energy efficient solution despite the support of wideband operation.

SUMMARY OF THE DISCLOSURE

Meanwhile, according to prior art, after activating BWP in a serving cell, the UE derives quality of the serving cell, e.g. reference signal received power (RSRP), reference signal received quality (RSRQ) or signal to interference and noise ratio (SINR), based on cell defining SS block (CD-SSB) regardless of the activated BWP. This means that the UE should measure the CD-SSB even though the CD-SSB is not present in the activated BWP and non-CD-SSB is present within the activated BWP.

It is obvious that the UE needs to measure the CD-SSB outside the activated BWP based on measurement gap if there is no SSB within the activated BWP. However, if the non-CD-SSB is present within the activated BWP, the UE does not need to measure the CD-SSB outside the activated BWP by using measurement gap, because it leads to service interruption and additional power consumption. Thus, a method for a UE to measure quality of a cell based on the primary reference signal or the secondary reference signal and an apparatus supporting the same need to be proposed.

One embodiment provides a method for performing a measurement by a user equipment (UE) in a wireless communication system. The method may include: configuring multiple bandwidth parts for a cell; configuring multiple reference signals for the cell; activating a first bandwidth part among the multiple bandwidth parts; when the activated first bandwidth part includes a first reference signal, activating the first reference signal included in the activated first bandwidth part; and performing the measurement for the cell based on the only activated first reference signal.

Another embodiment provides a user equipment (UE) performing a measurement in a wireless communication system. The UE may include: a memory; a transceiver; and a processor connected with the memory and the transceiver, and configured to: configure multiple bandwidth parts for a cell; configure multiple reference signals for the cell; activate a first bandwidth part among the multiple bandwidth parts; when the activated first bandwidth part includes a first reference signal, activate the first reference signal included in the activated first bandwidth part; and perform the measurement for the cell based on the only activated first reference signal.

Another embodiment provides a method for activating a bandwidth part by a base station (BS) in a wireless communication system. The method may include: configuring multiple bandwidth parts for a cell, to a user equipment (UE); configuring multiple reference signals for the cell, to the UE; and activating a first bandwidth part for the UE among the multiple bandwidth parts, wherein when the activated first bandwidth part includes a first reference signal, the first reference signal included in the activated first bandwidth part is activated by the UE, and wherein a measurement for the cell is performed by the UE based on the only activated first reference signal.

The UE can perform a measurement for a cell efficiently.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
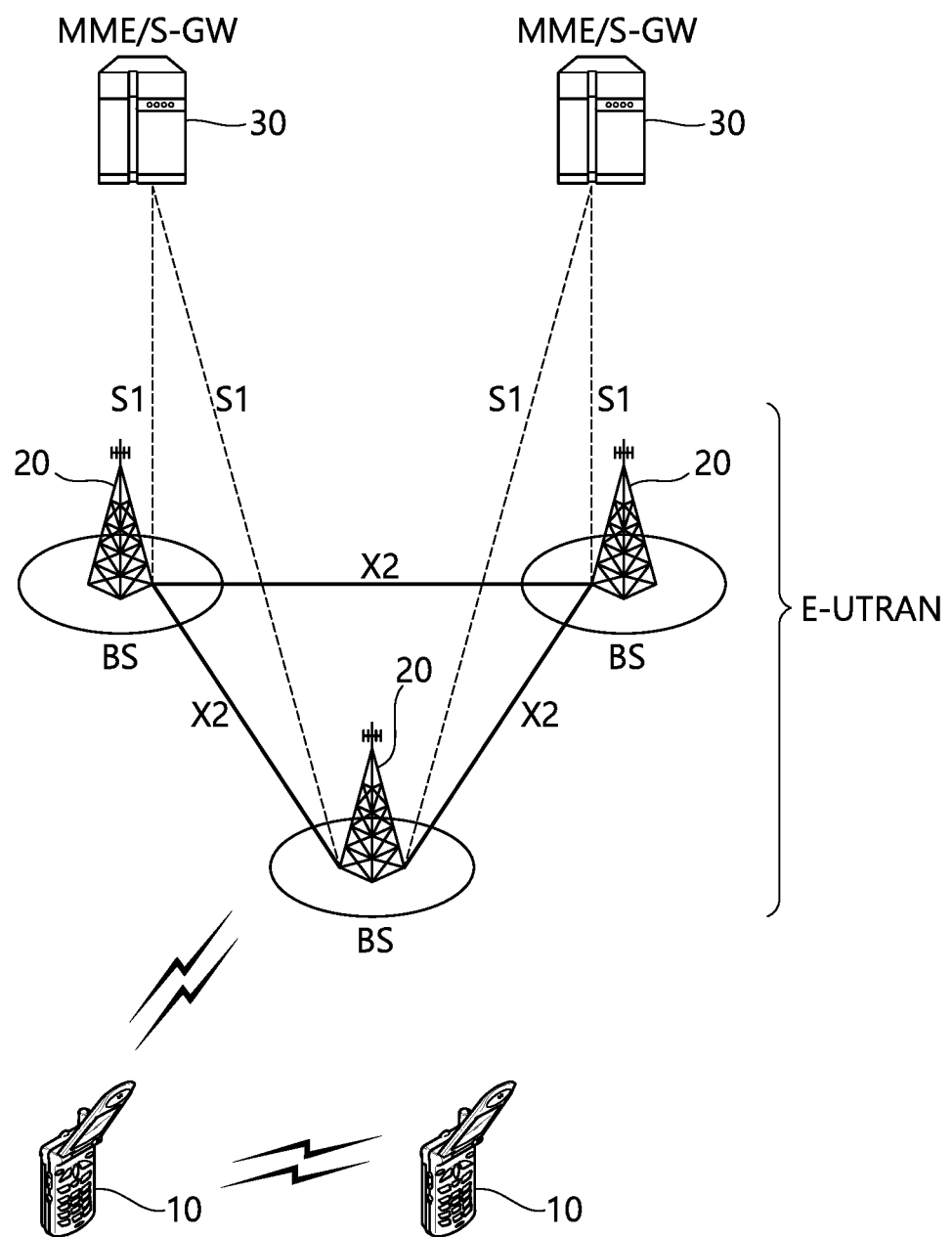
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
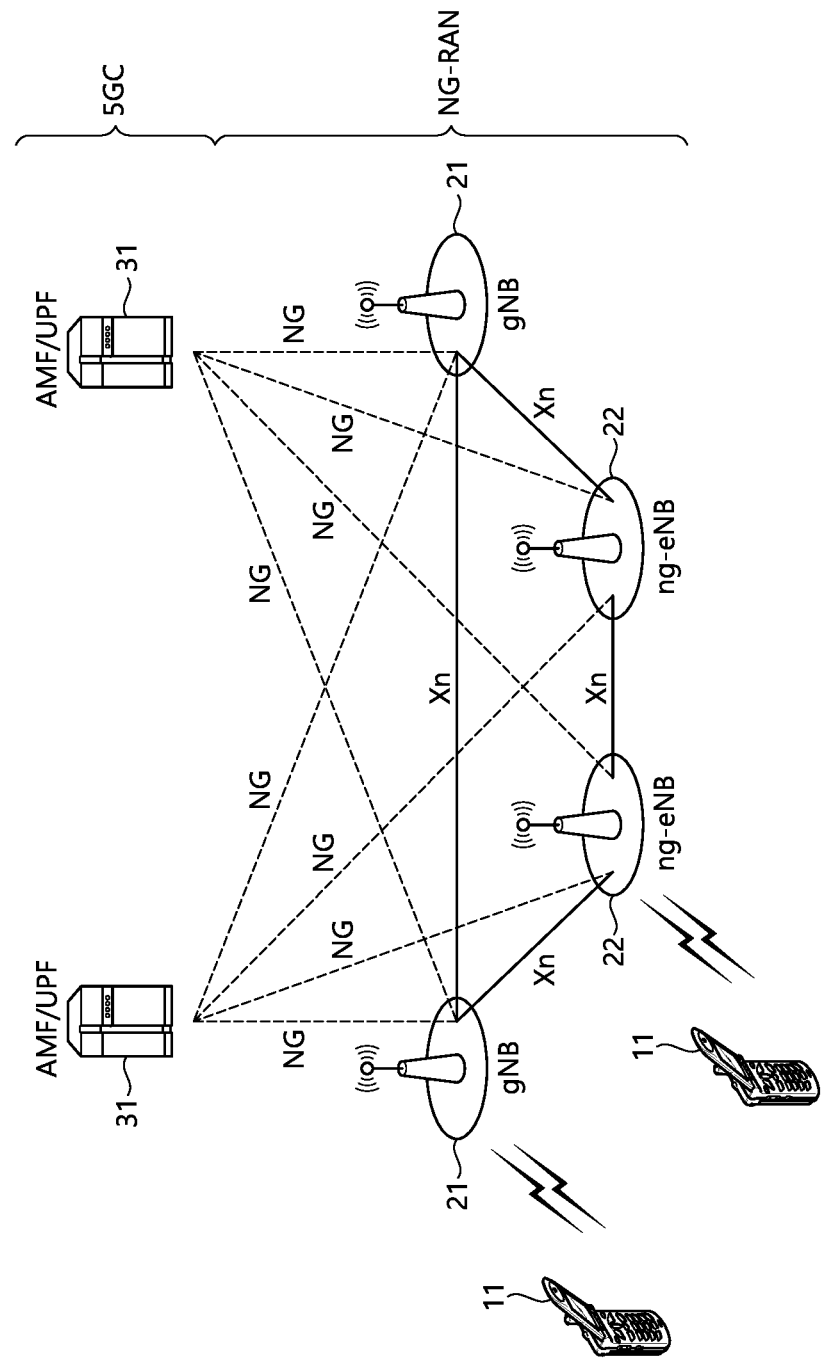
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
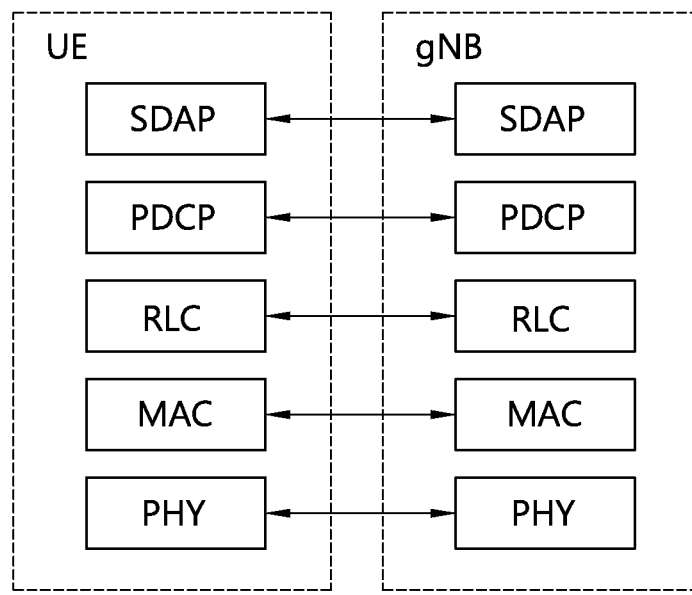
FIG. 3 shows a block diagram of a user plane protocol stack to which technical features of the present invention may be applied.
Figure 4:
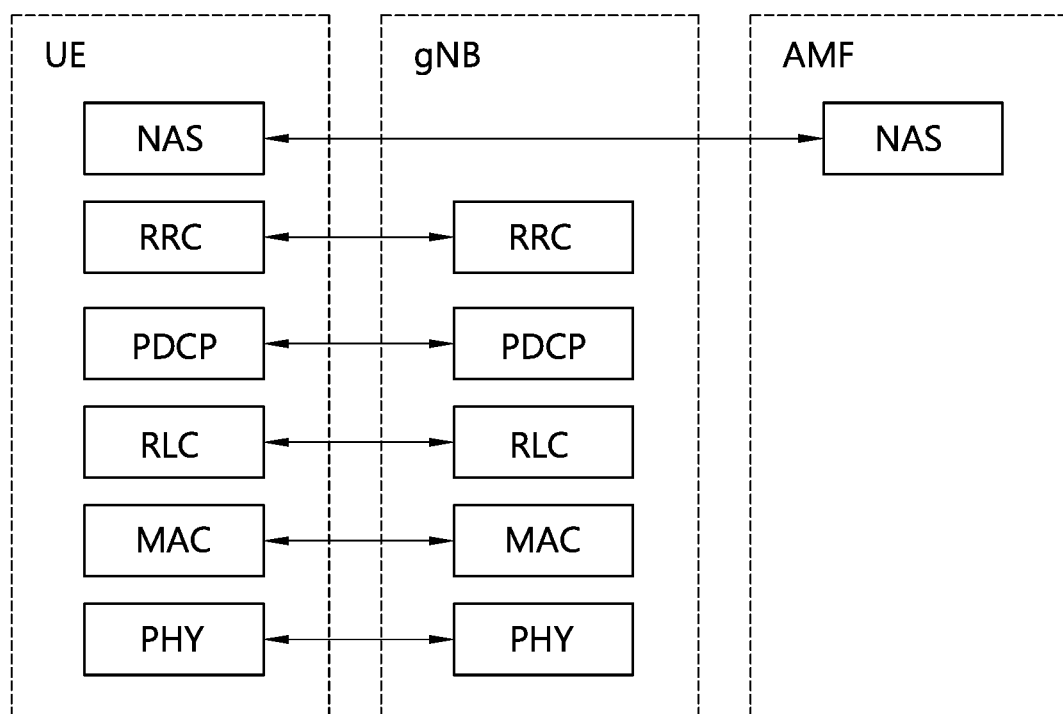
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
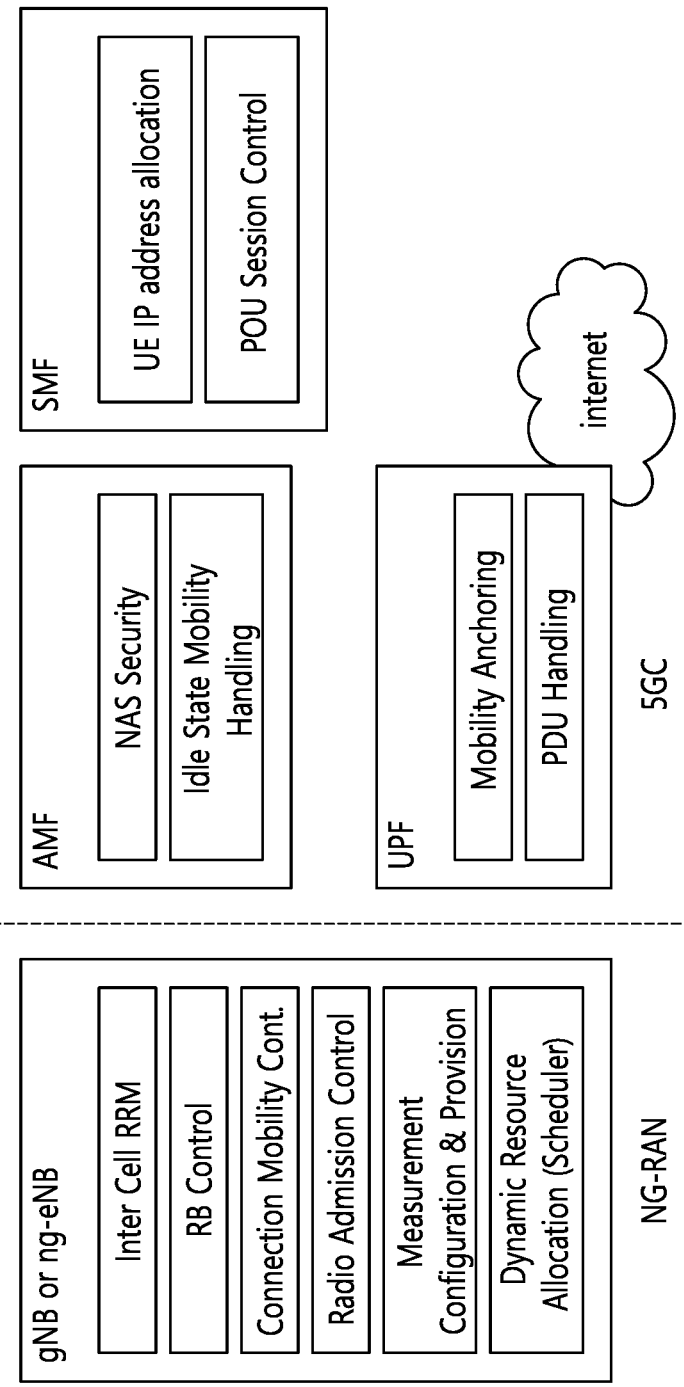
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:

NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:

Session Management;
UE IP address allocation and management;
Selection and control of UP function;
Configures traffic steering at UPF to route traffic to proper destination;
Control part of policy enforcement and QoS;
Downlink Data Notification.

Hereinafter, measurements is described.

A network may configure an RRC_CONNECTED UE to perform measurements and report them in accordance with the measurement configuration. The measurement configuration may be provided by means of dedicated signaling, e.g., using an RRC reconfiguration.

The network may configure the UE to perform the following types of measurements:

NR measurements;
Inter-RAT measurements of E-UTRA frequencies.

The network may configure the UE to report the following measurement information based on SS/PBCH block(s):

Measurement results per SS/PBCH block;
Measurement results per cell based on SS/PBCH block(s);
SS/PBCH block(s) indexes.

The network may configure the UE to report the following measurement information based on CSI-RS resources:

Measurement results per CSI-RS resource;
Measurement results per cell based on CSI-RS resource(s);
CSI-RS resource measurement identifiers.

The measurement configuration includes the following parameters:

(1) Measurement objects: A list of objects on which the UE shall perform the measurements.

(2) Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.
RS type: The RS that the UE uses for beam and cell measurement results (SS/PBCH block or CSI-RS).
Reporting format: The quantities per cell and per beam that the UE includes in the measurement report (e.g. RSRP) and other associated information such as the maximum number of cells and the maximum number beams per cell to report.

(3) Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

(4) Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

(5) Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signalling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

Hereinafter, bandwidth part (BWP) is described.

Figure 6:
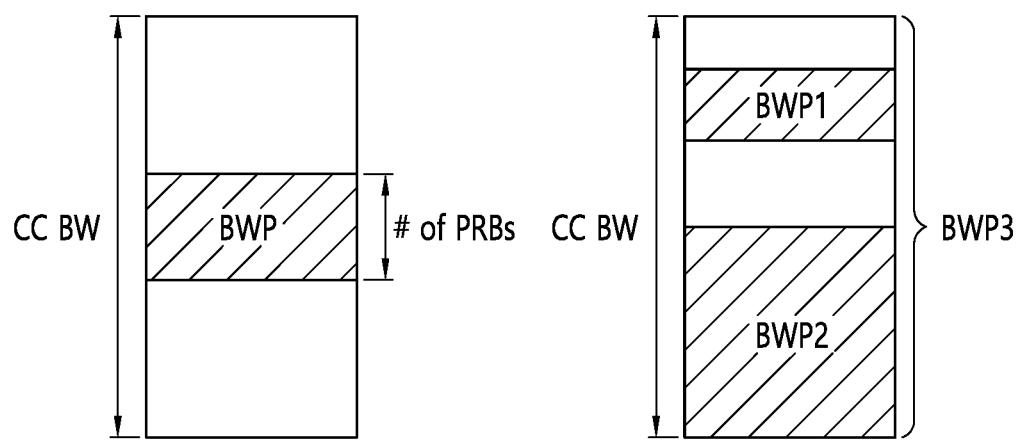
FIG. 6 shows an example of bandwidth part (BWP) configurations to which technical features of the present invention may be applied.

FIG. 6 shows an example of bandwidth part (BWP) configurations to which technical features of the present invention may be applied.

Referring to FIG. 6, a BWP consists of a group of contiguous physical resource blocks (PRBs). The bandwidth (BW) of a BWP cannot exceed the configured component carrier (CC) BW for the UE. The BW of the BWP must be at least as large as one synchronization signal (SS) block BW, but the BWP may or may not contain SS block. Each BWP is associated with a specific numerology, i.e., subcarrier spacing (SCS) and cyclic prefix (CP) type. Therefore, the BWP is also a means to reconfigure a UE with a certain numerology. As illustrated in the right figure of FIG. 6, the network can configure multiple BWPs to a UE via radio resource control (RRC) signaling, which may overlap in frequency. The granularity of BW configuration is one PRB. For each serving cell, DL and UL BWPs are configured separately and independently for paired spectrum and up to four BWPs can be configured for DL and UL each. For unpaired spectrum, a DL BWP and a UL BWP are jointly configured as a pair and up to 4 pairs can be configured. There can be maximally 4 UL BWPs configured for a supplemental UL (SUL) as well.

Each configured DL BWP includes at least one control resource set (CORESET) with UE-specific search space (USS). The USS is a searching space for UE to monitor possible reception of control information destined for the UE. In the primary carrier, at least one of the configured DL BWPs includes one CORESET with common search space (CSS). The CSS is a searching space for UE to monitor possible reception of control information common for all UEs or destined for the particular UE. If the CORESET of an active DL BWP is not configured with CSS, the UE is not required to monitor it. Note that UEs are expected to receive and transmit only within the frequency range configured for the active BWPs with the associated numerologies. However, there are exceptions; a UE may perform Radio Resource Management (RRM) measurement or transmit sounding reference signal (SRS) outside of its active BWP via measurement gap. The BWP is also a tool to switch the operating numerology of a UE. The numerology of the DL BWP configuration is used at least for the Physical Downlink Control Channel (PDCCH), Physical Downlink Shared Channel (PDSCH) and corresponding demodulation RS (DMRS). Likewise, the numerology of the UL BWP configuration is used at least for the Physical Uplink Control Channel (PUCCH), Physical Uplink Shared Channel (PUSCH) and corresponding DMRS. On the other hand, it is noted that there is a restriction in the configuration of numerology at least in the early version of NR. That is, the same numerology shall be used within the same PUCCH group including both DL and UL.

Multiple options could be supported for activation/deactivation of BWPs. In addition to the activation/deactivation via dedicated RRC signaling, downlink control information (DCI) based activation/deactivation is supported. On the other hand, the DCI based mechanism, although more prompt than the one based on MAC CE, requires additional consideration for error case handling, i.e., the case when a UE fails to decode the DCI containing the BWP activation/deactivation command. To help to recover from such a DCI lost case, the activation/deactivation of DL BWP (or DL/UL BWP pair for the case of unpaired spectrum) by means of timer is also introduced. With this mechanism, if a UE is not scheduled for a certain amount of time, i.e., expiration of timer, the UE switches its active DL BWP (or DL/UL BWP pair) to the default one. There is an initial active BWP for a UE during the initial access until the UE is explicitly configured with BWPs during or after RRC connection establishment. The initial active BWP is the default BWP, unless configured otherwise. For instance, for a UE, there is at most one active DL BWP and at most one active UL BWP. The HARQ retransmission across different BWPs is supported when a UE's active BWP is switched.

Figure 7:
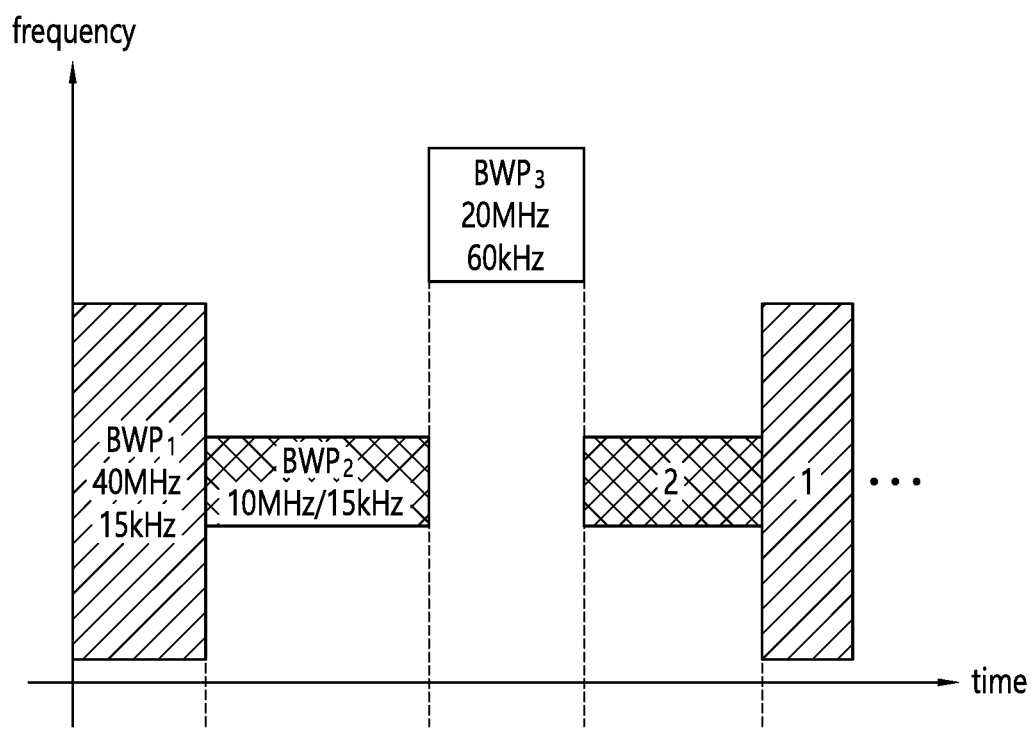
FIG. 7 shows an example where three different BWPs are configured to which technical features of the present invention may be applied.

FIG. 7 shows an example where three different BWPs are configured to which technical features of the present invention may be applied.

Referring to FIG. 7, BWP1 may be configured with a width of 40 MHz and subcarrier spacing of 15 kHz, and BWP2 may be configured with a width of 10 MHz and subcarrier spacing of 15 kHz, and BWP3 may be configured with a width of 20 MHz and subcarrier spacing of 60 kHz.

Meanwhile, according to prior art, after activating BWP in a serving cell, the UE derives quality of the serving cell, e.g. reference signal received power (RSRP), reference signal received quality (RSRQ) or signal to interference and noise ratio (SINR), based on cell defining SS block (CD-SSB) regardless of the activated BWP. This means that the UE should measure the CD-SSB even though the CD-SSB is not present in the activated BWP and non-CD-SSB is present within the activated BWP.

It is obvious that the UE needs to measure the CD-SSB outside the activated BWP based on measurement gap if there is no SSB within the activated BWP. However, if the non-CD-SSB is present within the activated BWP, the UE does not need to measure the CD-SSB outside the activated BWP by using measurement gap, because it leads to service interruption and additional power consumption. In the present invention, the CD-SSB may be refer to as a primary reference signal, and the non-CD-SSB may be refer to as a non-primary reference signal or a secondary reference signal. Hereinafter, a method for a UE to measure quality of a cell based on the primary reference signal or the secondary reference signal and an apparatus supporting the same according to an embodiment of the present invention are described in detail.

Figure 8:
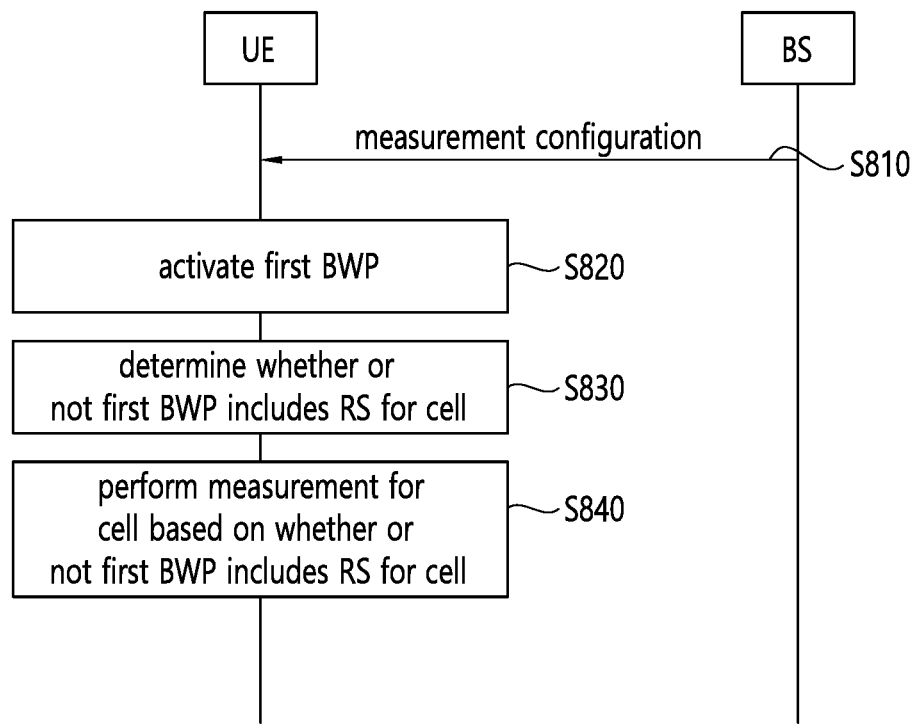
FIG. 8 shows a procedure for measuring quality of a cell based on a primary reference signal or a secondary reference signal according to an embodiment of the present invention.

FIG. 8 shows a procedure for measuring quality of a cell based on a primary reference signal or a secondary reference signal according to an embodiment of the present invention.

Figure 9:
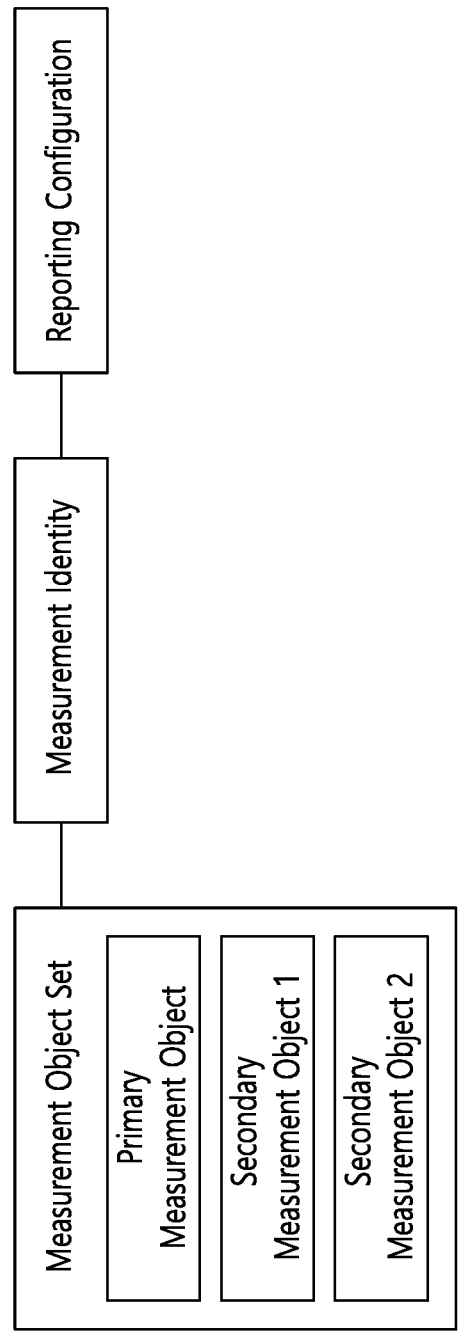
FIG. 9 shows an example of link between a measurement object set and a reporting configuration according to an embodiment of the present invention.

Referring to FIG. 8, in step S810, the UE may receive a measurement configuration from a base station. The measurement configuration may include a measurement object set. For each serving carrier frequency, the UE may be configured with one measurement object set. The measurement object set may include one primary measurement object containing a CD-SSB and one or more associated secondary measurement objects containing a non-CD-SSB. Each measurement identity may link one measurement object set with one reporting configuration as shown in FIG. 9. FIG. 9 shows an example of link between a measurement object set and a reporting configuration according to an embodiment of the present invention.

Figure 10:
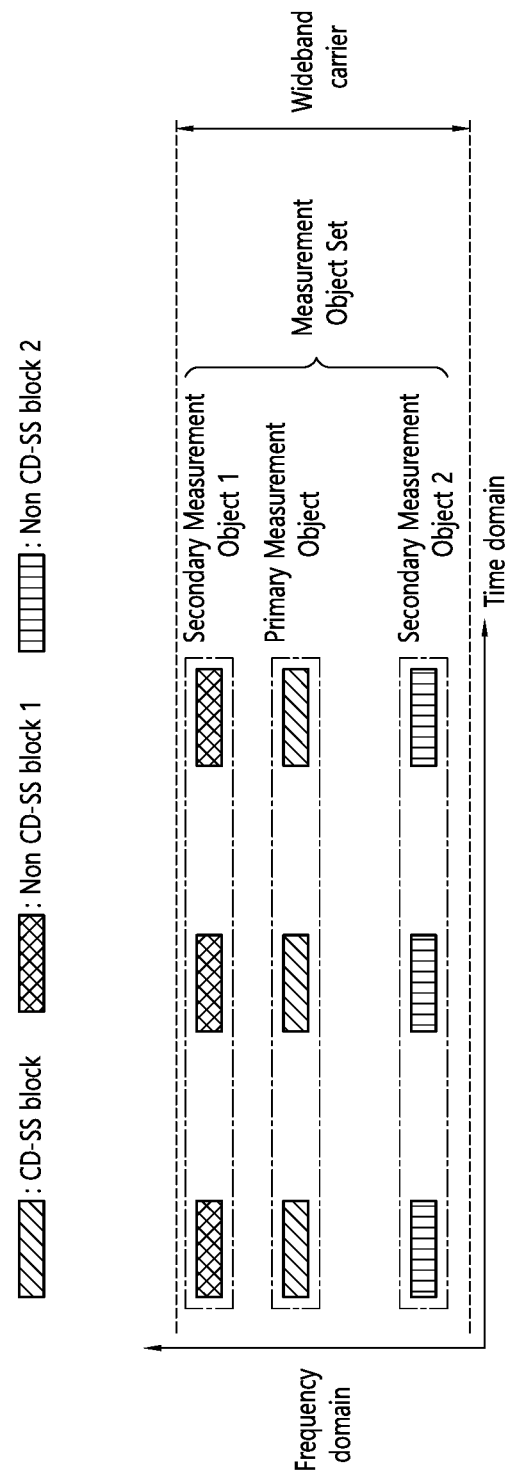
FIG. 10 shows an example of a measurement object set for serving carrier according to an embodiment of the present invention.

FIG. 10 shows an example of a measurement object set for serving carrier according to an embodiment of the present invention.

Referring to FIG. 10, the measurement object set may be configured for a wideband carrier. The measurement object set may include a primary measurement object containing a CD-SSB, a secondary measurement object 1 containing a non-CD-SSB 1, and a secondary measurement object 2 containing a non-CD-SSB 2.

Returning back to FIG. 8, in step S810, alternatively, the measurement configuration may include multiple measurement objects. For each serving carrier frequency, the UE may be configured with multiple measurement objects. One of them may be primary measurement object containing a CD-SSB and others may be secondary measurement object(s) containing a non-CD-SSB. In this case, each measurement identity links one measurement object with one reporting configuration.

In step S820, the UE may activate at least one measurement object. In other words, the UE may activate at least one BWP related to at least one measurement object. Only one measurement object can be activated among a primary measurement object and associated secondary measurement objects at a time. That is, only one measurement object can be activated for each serving carrier frequency. Alternatively, multiple measurement objects can be activated among a primary measurement object and associated secondary measurement objects at a time. In the embodiment of FIG. 8, it is assumed that the UE activates the first BWP. The first BWP may be related to the primary measurement object or the secondary measurement object. The primary measurement object may include at least one primary reference signal, and the secondary measurement object may include at least one secondary reference signal. That is, the first BWP may include at least one primary reference signal or at least one secondary reference signal.

In step S830, the UE may determine whether or not the first BWP includes a reference signal for a cell. The reference signal may be at least one primary reference signal or at least one secondary reference signal. The cell may be a serving cell of the UE.

In step S830, the UE may perform a measurement for the cell based on whether or not the first BWP includes the reference signal for the cell. If the UE determines that the first BWP includes the primary reference signal for the cell, the UE may perform a measurement for the cell based on the primary reference signal. If the UE determines that the first BWP includes the secondary reference signal for the cell, the UE may perform a measurement for the cell based on the secondary reference signal. If the UE determines that the first BWP does not include any reference signal for the cell, the UE may perform a measurement for the cell based on the primary reference signal included in another BWP by using measurement gap.

In other words, the UE may derive serving cell quality, such as RSRP/RSRQ or SINR, based on SSB indicated in an activated measurement object. The UE does not perform any measurement based on SSB indicated in a de-activated measurement object.

The UE may activate primary measurement object or one of secondary measurement objects as follows:

If UE cannot perform CD-SSB based serving cell measurements without measurement gap, and is able to perform serving cell measurements based on non CD-SSB indicated in a secondary measurement object without measurement gap, i.e. without RF tuning, the UE may activate the secondary measurement object.

Otherwise, the UE may activate the primary measurement object.

According to an embodiment of the present invention, the UE can perform a measurement for a cell efficiently in case that BWPs are configured for the cell. Thus, service interruption and additional power consumption may not be occurred.

FIG. 11 to FIG. 14 are diagrams for explaining a method in which a UE measures quality of a cell based on a primary reference signal or a secondary reference signal according to an embodiment of the present invention.

Figure 11:
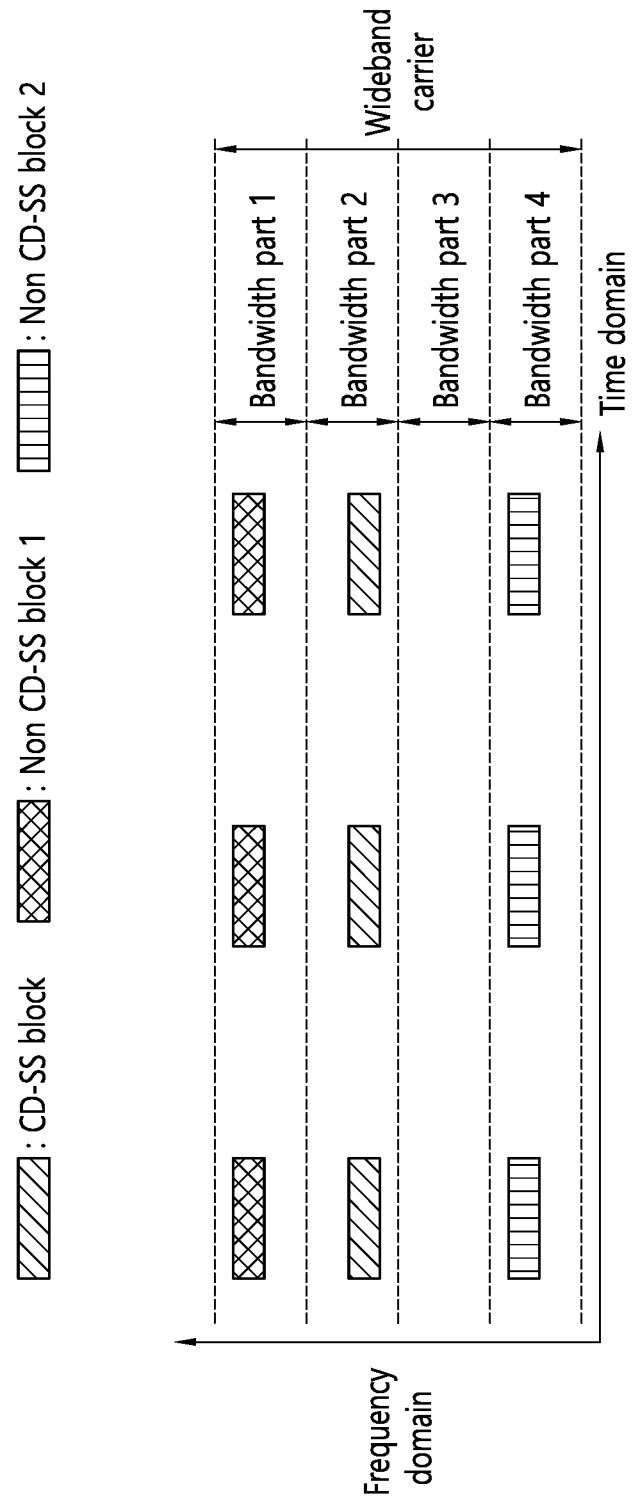
FIG. 11 to FIG. 14 are diagrams for explaining a method in which a UE measures quality of a cell based on a primary reference signal or a secondary reference signal according to an embodiment of the present invention.

Referring to FIG. 11, for example, the UE may be configured with four BWPs, i.e. BWP1, 2, 3 and 4. The UE may be configured with a measurement object set or multiple measurement objects for serving carrier, i.e. primary measurement object, secondary measurement object 1 and secondary measurement object 2. The CD-SSB may be indicated in the primary measurement object meanwhile non-CD-SSBs 1 and 2 may be indicated in secondary measurement object 1 and 2, respectively.

Figure 12:
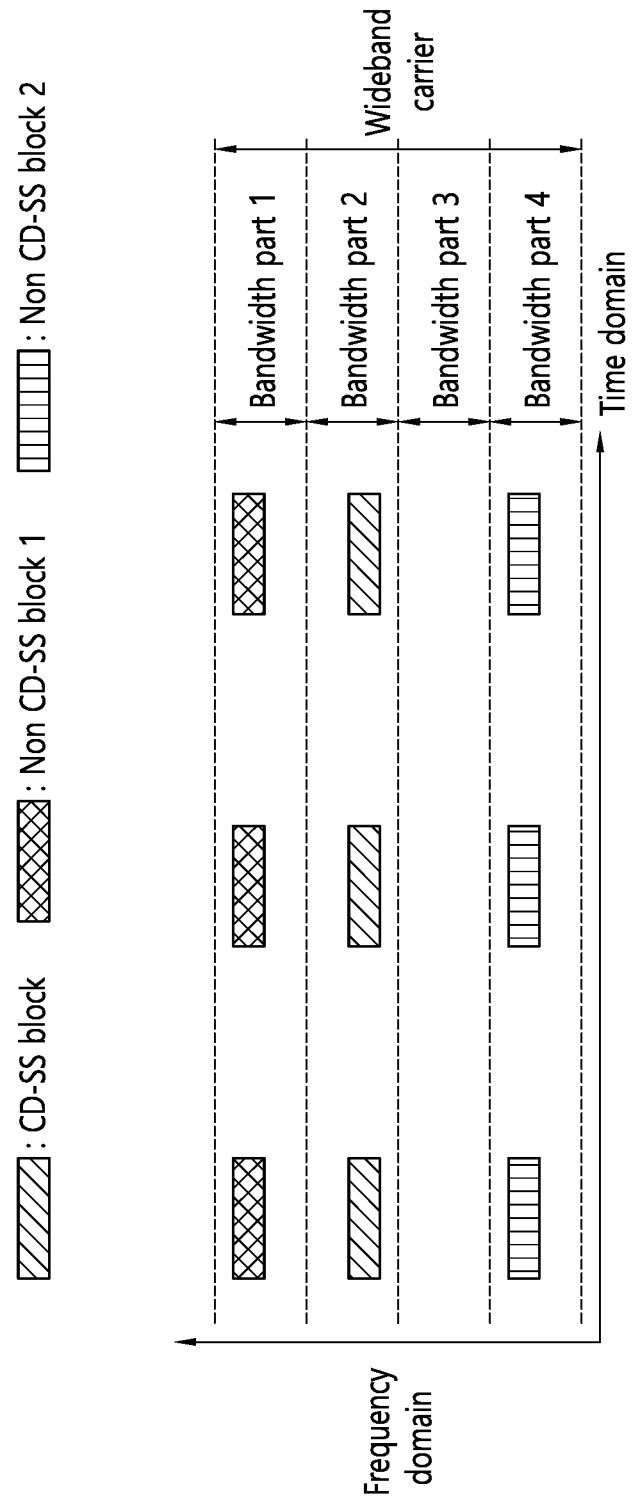

Referring to FIG. 12, if BWP2 is activated for the UE and CD-SSB is present within the activated BWP, the UE does not need to retune RF to measure the CD-SSB, i.e. measurement gap is not needed. So the UE may consider the primary measurement object is activated, and derive serving cell qualities based on the CD-SSB. Further, the UE may consider secondary measurement objects 1 and 2 are de-activated, and the UE does not perform any measurement based on the non-CD-SSBs 1 and 2.

Figure 13:
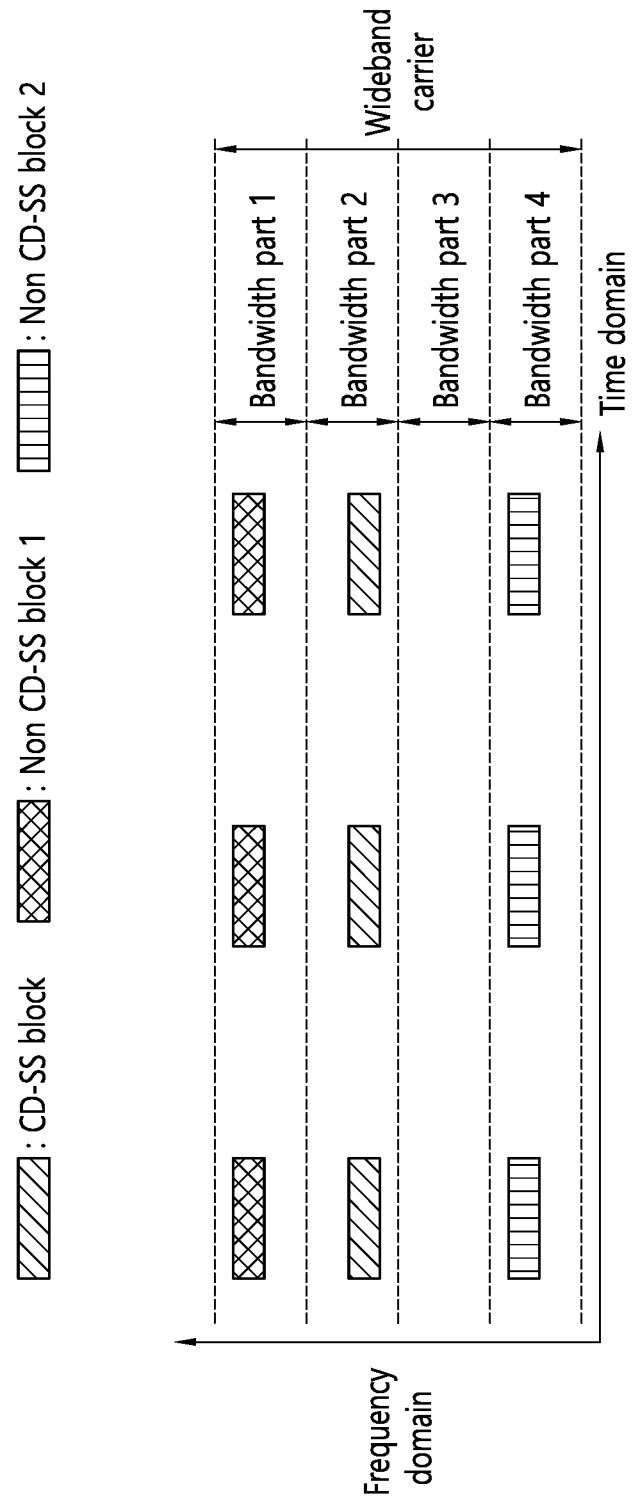

Referring to FIG. 13, if BWP3 is only activated for the UE and there is no CD-SSB or non-CD-SSB within the activated BWP, the UE cannot perform CD-SSB based measurements or non-CD-SSB based measurements without measurement gap. So the UE may consider the primary measurement object is activated and derive serving cell quality based on the CD-SSB.

Figure 14:
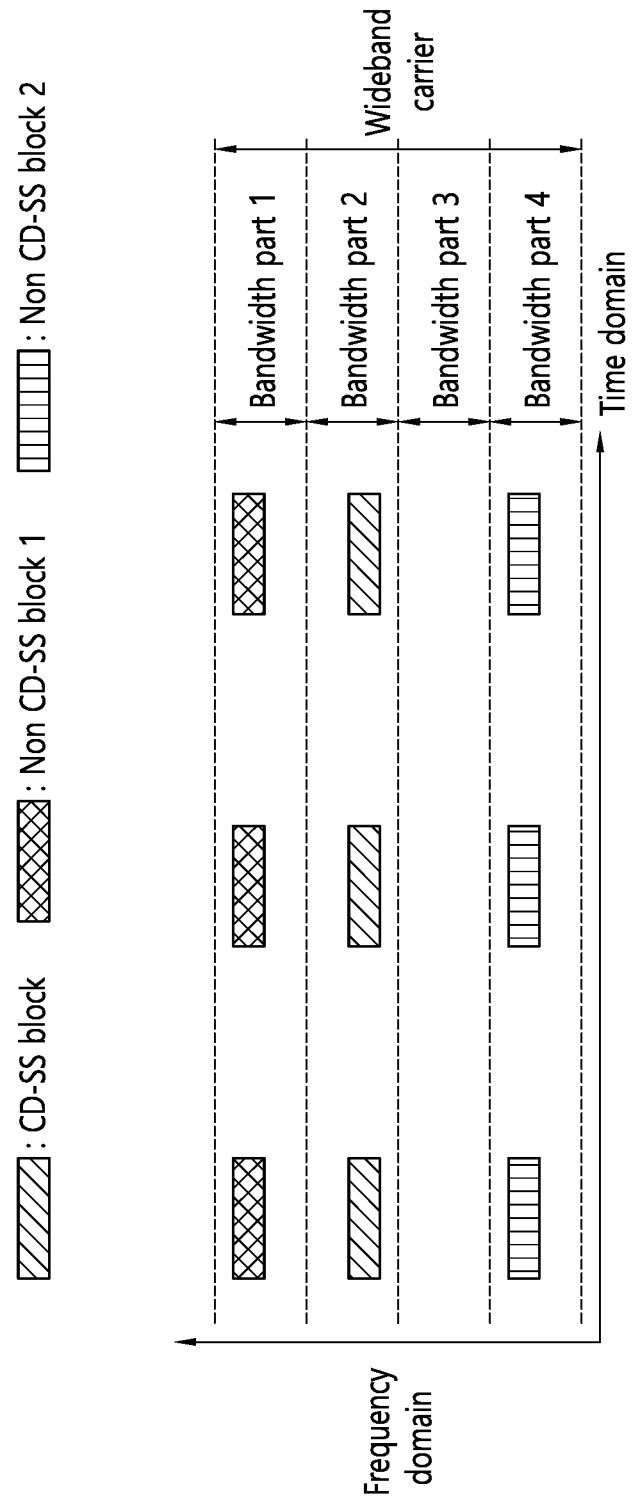

Referring to FIG. 14, if BWP1 is activated and BWP2 is de-activated, the CD-SSB is present outside the activated BWP. In this case, the UE cannot perform CD-SSB based serving cell measurements without RF retuning. Meanwhile, non-CD-SSB indicated in secondary measurement object 1 may be present within activated BWP, so the UE is able to perform non-CD-SSB1 based measurements without measurement gap. So the UE may deactivate the primary measurement object and activate the secondary measurement object 1. Further, the UE may perform serving cell measurements based on activated measurement object, i.e. non CD-SSB1.

Figure 15:
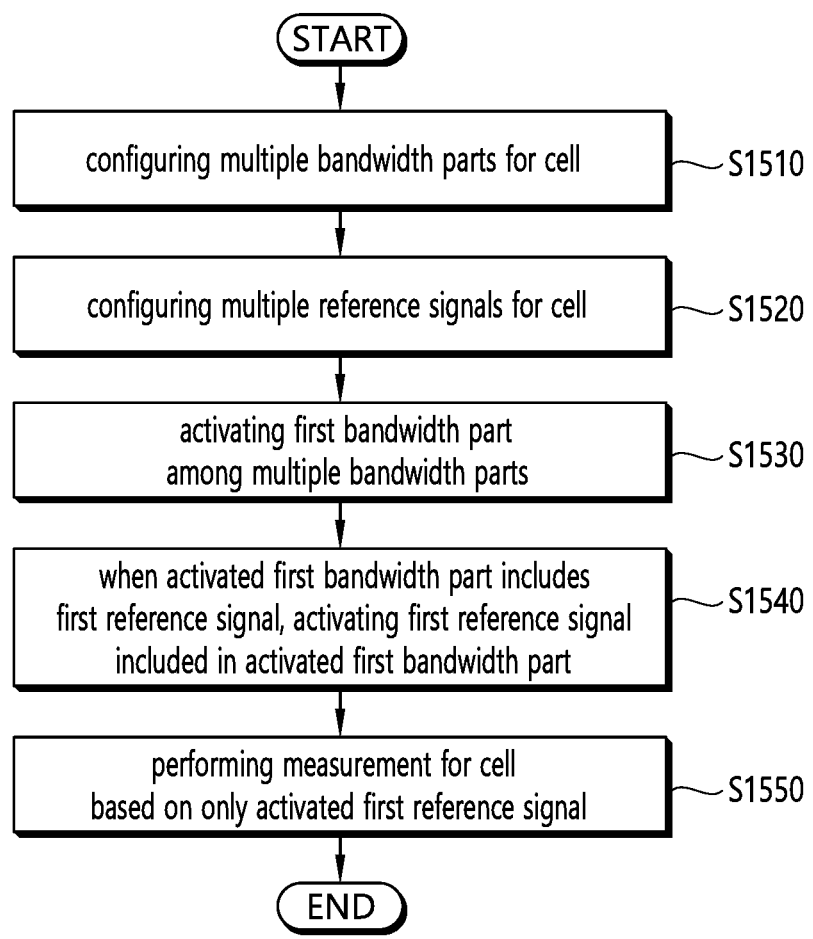
FIG. 15 shows a method for performing a measurement by a UE according to an embodiment of the present invention.

FIG. 15 shows a method for performing a measurement by a UE according to an embodiment of the present invention. The present invention described above for UE side may be applied to this embodiment.

Referring to FIG. 15, in step S1510, the UE may configure multiple bandwidth parts for a cell. The cell may be a serving cell of the UE.

In step S1520, the UE may configure multiple reference signals for the cell. The multiple reference signals may be related to the multiple bandwidth parts.

In step S1530, the UE may activate a first bandwidth part among the multiple bandwidth parts. In addition, the multiple bandwidth parts except for the first bandwidth part may be deactivated.

In step S1540, the UE may activate a first reference signal included in the activated first bandwidth part when the activated first bandwidth part includes the first reference signal.

In step S1550, when the activated first bandwidth part includes the first reference signal, the UE may perform the measurement for the cell based on the only activated first reference signal. Alternatively, when the activated first bandwidth part does not include any reference signal, the UE may perform the measurement for the cell based on a second reference signal and a measurement gap, where the second reference signal may be a primary reference signal.

Further, the UE may deactivate at least one second reference signal not included in the activated first bandwidth part. The measurement for the cell may be not performed based on the at least one second reference signal.

Further, the UE may derive a quality of the serving cell based on the measurement for the cell.

Further, the UE may receive a measurement object set including a primary measurement object and at least one secondary measurement object, from a base station, where the primary measurement object includes a primary reference signal and the secondary measurement object includes a non-primary reference signal. In this case, the multiple reference signals may include the primary reference signal and the non-primary reference signal, and the first reference signal is the primary reference signal. Alternatively, the multiple reference signals may include the primary reference signal and the non-primary reference signal, the first reference signal is the non-primary reference signal.

Further, after activating the first reference signal included in the activated first bandwidth part, the UE may activate a second bandwidth part among the multiple bandwidth parts and deactivating the first bandwidth part, and activate a second reference signal included in the activated second bandwidth part, and perform the measurement for the cell based on the only activated second reference signal.

According to an embodiment of the present invention, the UE can perform a measurement for a cell efficiently in case that BWPs are configured for the cell. Thus, service interruption and additional power consumption may not be occurred.

Figure 16:
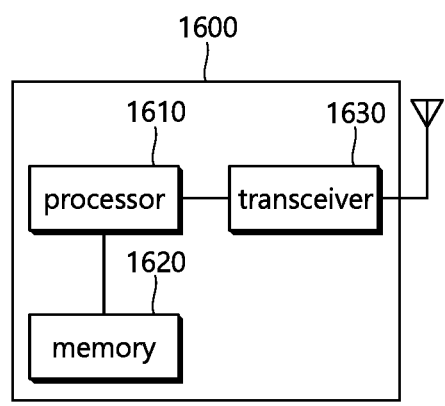
FIG. 16 shows a UE to implement an embodiment of the present invention.

FIG. 16 shows a UE to implement an embodiment of the present invention. The present invention described above for UE side may be applied to this embodiment.

A UE 1600 includes a processor 1610, a memory 1620 and a transceiver 1630. The processor 1610 may be configured to implement proposed functions, procedures and/or methods described in this description. Layers of the radio interface protocol may be implemented in the processor 1610.

Specifically, the processor 1610 may configure multiple bandwidth parts for a cell. The cell may be a serving cell of the UE.

Further, the processor 1610 may configure multiple reference signals for the cell. The multiple reference signals may be related to the multiple bandwidth parts.

Further, the processor 1610 may activate a first bandwidth part among the multiple bandwidth parts. In addition, the multiple bandwidth parts except for the first bandwidth part may be deactivated.

Further, the processor 1610 may activate a first reference signal included in the activated first bandwidth part when the activated first bandwidth part includes the first reference signal.

Further, when the activated first bandwidth part includes the first reference signal, the processor 1610 may perform the measurement for the cell based on the only activated first reference signal. Alternatively, when the activated first bandwidth part does not include any reference signal, the processor 1610 may perform the measurement for the cell based on a second reference signal and a measurement gap, where the second reference signal may be a primary reference signal.

Further, the processor 1610 may deactivate at least one second reference signal not included in the activated first bandwidth part. The measurement for the cell may be not performed based on the at least one second reference signal.

Further, the processor 1610 may derive a quality of the serving cell based on the measurement for the cell.

Further, the processor 1610 may control the transceiver 1630 to receive a measurement object set including a primary measurement object and at least one secondary measurement object, from a base station, where the primary measurement object includes a primary reference signal and the secondary measurement object includes a non-primary reference signal. In this case, the multiple reference signals may include the primary reference signal and the non-primary reference signal, and the first reference signal is the primary reference signal. Alternatively, the multiple reference signals may include the primary reference signal and the non-primary reference signal, the first reference signal is the non-primary reference signal.

Further, after activating the first reference signal included in the activated first bandwidth part, the processor 1610 may activate a second bandwidth part among the multiple bandwidth parts and deactivating the first bandwidth part, and activate a second reference signal included in the activated second bandwidth part, and perform the measurement for the cell based on the only activated second reference signal.

The memory 1620 is operatively coupled with the processor 1610 and stores a variety of information to operate the processor 1610. The transceiver 1620 is operatively coupled with the processor 1610, and transmits and/or receives a radio signal.

Figure 17:
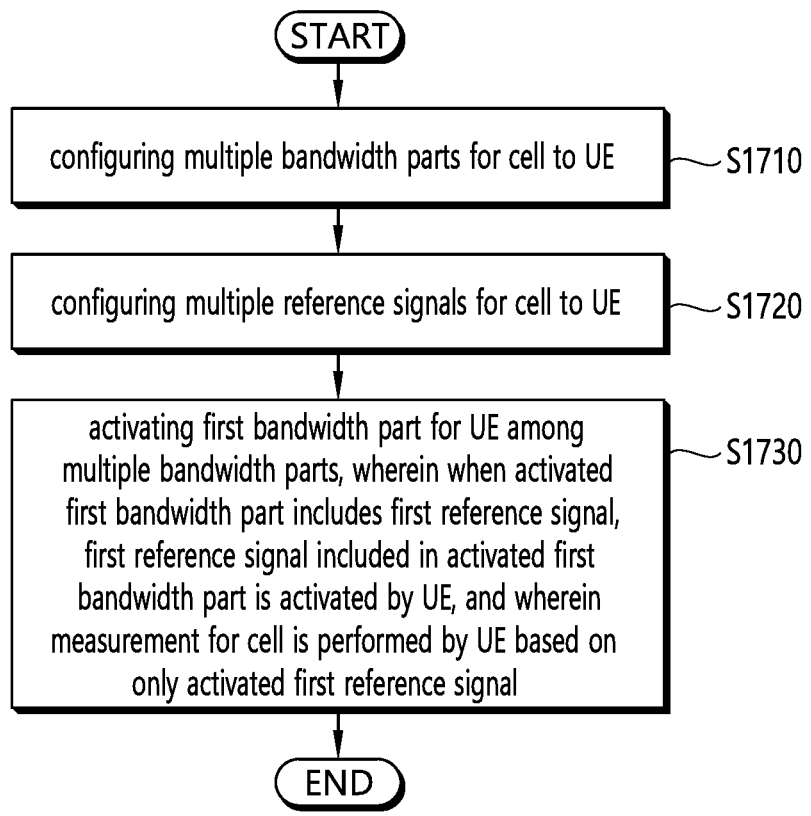
FIG. 17 shows a method for activating a bandwidth part by a BS according to an embodiment of the present invention.

FIG. 17 shows a method for activating a bandwidth part by a BS according to an embodiment of the present invention. The present invention described above for BS side may be applied to this embodiment.

Referring to FIG. 17, in step S1710, the BS may configure multiple bandwidth parts for a cell, to a user equipment (UE). In step S1720, the BS may configure multiple reference signals for the cell, to the UE. In step S1730, the BS may activate a first bandwidth part for the UE among the multiple bandwidth parts. In this case, a first reference signal included in the activated first bandwidth part is activated by the UE when the activated first bandwidth part includes the first reference signal, and a measurement for the cell is performed by the UE based on the only activated first reference signal.

Figure 18:
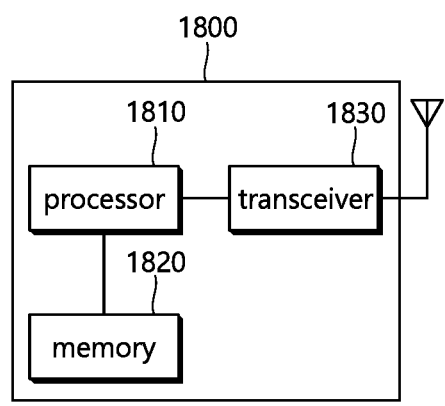
FIG. 18 shows a BS to implement an embodiment of the present invention.

FIG. 18 shows a BS to implement an embodiment of the present invention. The present invention described above for BS side may be applied to this embodiment.

A BS 1800 includes a processor 1810, a memory 1820 and a transceiver 1830. The processor 1810 may be configured to implement proposed functions, procedures and/or methods described in this description. Layers of the radio interface protocol may be implemented in the processor 1810.

Specifically, the processor 1810 may configure multiple bandwidth parts for a cell, to a user equipment (UE). Further, the processor 1810 may configure multiple reference signals for the cell, to the UE. Further, the processor 1810 may activate a first bandwidth part for the UE among the multiple bandwidth parts. In this case, a first reference signal included in the activated first bandwidth part is activated by the UE when the activated first bandwidth part includes the first reference signal, and a measurement for the cell is performed by the UE based on the only activated first reference signal.

The memory 1820 is operatively coupled with the processor 1810 and stores a variety of information to operate the processor 1810. The transceiver 1830 is operatively coupled with the processor 1810, and transmits and/or receives a radio signal.

The processor 1610, 1810 may include an application-specific integrated circuit (ASIC), a separate chipset, a logic circuit, and/or a data processing unit. The memory 1620, 1820 may include a read-only memory (ROM), a random access memory (RAM), a flash memory, a memory card, a storage medium, and/or other equivalent storage devices. The transceiver 1630, 1830 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1610, 1810. The memory 1620, 1820 may be located inside or outside the processor 1610, 1810, and may be coupled to the processor 1610, 1810 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a measurement by a user equipment (UE) in a wireless communication system, the method comprising:

configuring multiple bandwidth parts for a cell;

configuring multiple reference signals for the cell;

activating a first bandwidth part among the multiple bandwidth parts;

receiving, from a base station, a measurement object set including a primary measurement object and at least one secondary measurement object, wherein the primary measurement object includes a primary reference signal and the at least one secondary measurement object includes a non-primary reference signal;

based on the activated first bandwidth part including a first reference signal, activating the first reference signal included in the activated first bandwidth part; and performing the measurement for the cell based on only the activated first reference signal.

2. The method of claim 1, further comprising:
deactivating at least one second reference signal not included in the activated first bandwidth part.

3. The method of claim 2, wherein the measurement for the cell is not performed based on the at least one second reference signal.

4. The method of claim 1, wherein the multiple bandwidth parts except for the first bandwidth part are deactivated.

5. The method of claim 1, further comprising:
based on the activated first bandwidth part including no reference signal, performing the measurement for the cell based on a second reference signal and a measurement gap, wherein the second reference signal is the primary reference signal.

6. The method of claim 1, wherein the cell is a serving cell of the UE.

7. The method of claim 1, further comprising:
deriving a quality of the serving cell based on the measurement for the cell.

8. The method of claim 1, wherein the multiple reference signals are related to the multiple bandwidth parts.

9. The method of claim 1, wherein the multiple reference signals includes the primary reference signal and the non-primary reference signal.

10. The method of claim 1, wherein the first reference signal is the primary reference signal.

11. The method of claim 1, wherein the first reference signal is the non-primary reference signal.

12. The method of claim 1, further comprising:
after activating the first reference signal included in the activated first bandwidth part, activating a second bandwidth part among the multiple bandwidth parts and deactivating the first bandwidth part;
activating a second reference signal included in the activated second bandwidth part; and
performing the measurement for the cell based on only the activated second reference signal.

13. A user equipment (UE) configured to perform a measurement in a wireless communication system, the UE comprising:
a memory; a transceiver; and
a processor operatively connected with the memory and the transceiver, and configured to:
configure multiple bandwidth parts for a cell;
configure multiple reference signals for the cell;
activate a first bandwidth part among the multiple bandwidth parts;
control the transceiver to receive, from a base station, a measurement object set including a primary measurement object and at least one secondary measurement object, wherein the primary measurement object includes a primary reference signal and the at least one secondary measurement object includes a non-primary reference signal;
based on the activated first bandwidth part including a first reference signal, activate the first reference signal included in the activated first bandwidth part; and
perform the measurement for the cell based on only the activated first reference signal.

* * * * *